United States Patent [19]

Rossigno

[11] 3,790,807
[45] Feb. 5, 1974

[54] TOW VEHICLE TRAILER BRAKING SYSTEM

[75] Inventor: Louis P. Rossigno, South Bend, Ind.
[73] Assignee: The Bendix Corporation, South Bend, Ill.
[22] Filed: Dec. 22, 1972
[21] Appl. No.: 317,859

[52] U.S. Cl. .................. 303/7, 188/152, 303/13
[51] Int. Cl. .................................... B60t 13/60
[58] Field of Search ............ 303/7, 9, 13, 15, 2–4, 303/20; 188/3, 359, 106 P, 151 A, 151 R, 152; 91/459, 369, 376

[56] References Cited
UNITED STATES PATENTS
3,350,142  10/1967  Schuman ........................... 303/7
3,364,818  1/1968  Hager et al. ..................... 91/459

Primary Examiner—Duane A. Reger
Assistant Examiner—D. C. Butler
Attorney, Agent, or Firm—Leo H. McCormick, Jr.; William N. Antonis

[57] ABSTRACT

A solenoid operated control valve for establishing an operational pressure differential in a servomotor located in a trailer to activate the wheel brakes of the trailer in response to an operational electrical signal derived from corresponding hydraulic actuation of the wheel brakes of a tow vehicle.

12 Claims, 1 Drawing Figure

PATENTED FEB 5 1974
3,790,807
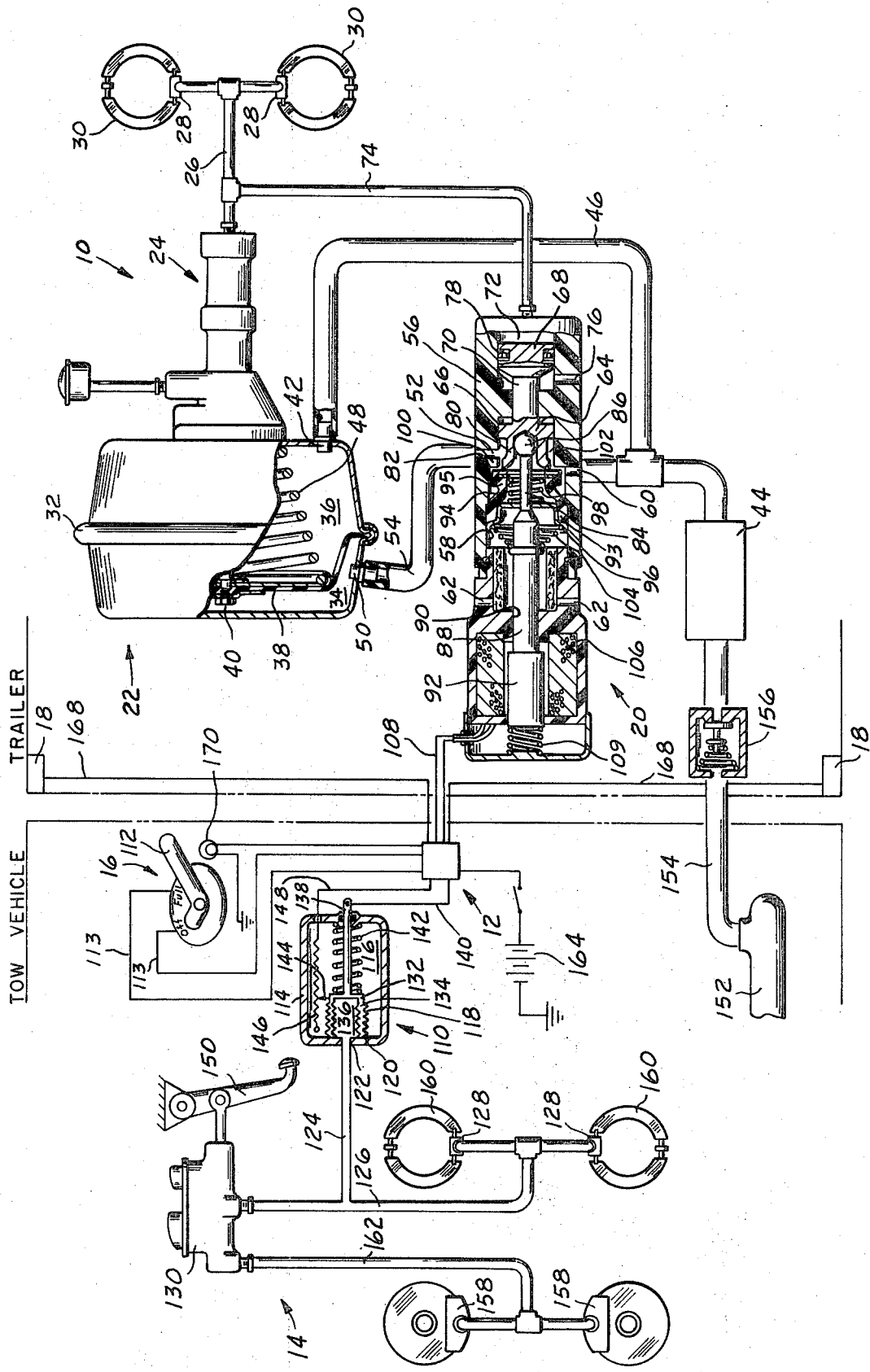

3,790,807

TOW VEHICLE TRAILER BRAKING SYSTEM

BACKGROUND OF THE INVENTION

An ever increasing number of people are purchasing house trailers, recreational trailers and small cargo trailers which are propelled by a tow vehicle. Most of these people will be unaccustomed to driving a tow vehicle while pulling a trailer. Because of the change in stopping characteristics experienced through a time lag developed from the initial activation of the brakes of the tow vehicle to the activation of the trailer brakes, various systems have been proposed to synchronize the activation of the wheel brakes on the trailer with the tow vehicle.

In copending U. S. Application Ser. No. 267,294, a tow vehicle trailer braking system interconnected by a hydraulic proportioning control valve is activated upon receiving a pneumatic input from a tow vehicle and an electrical signal from the brake light switch. However, in this system the pneumatic actuation apparatus is carried by the tow vehicle. Most people do not want to have the tow vehicle continually connected to the trailers and of necessity, disconnect the trailer many times while on vacation at camp sites. Unfortunately, the pneumatic actuation apparatus will continue to occupy space in the tow vehicle.

SUMMARY OF THE INVENTION

In order to reduce the number of connections to develop an operational braking system in the trailer, I have devised a tow vehicle trailer braking system wherein an electrical signal derived from the hydraulic pressure of the actuation fluid going to the wheel brakes of the tow vehicle is utilized to provide a first operational signal for activating the wheel brakes of the trailer. The first operational signal will energize a solenoid control valve means for interrupting vacuum communication between the rear chamber of a servomotor means and a source of vacuum and allowing air at atmospheric pressure into the rear chamber to create an operational pressure differential therein with vacuum in the front chamber. This operational pressure differential will move a wall means in the servomotor to pressurize the operational hydraulic fluid for the wheel brake to sequentially provide a uniformity in the wheel brake application of the tow vehicle and the trailer.

It is an object of this invention to provide a tow vehicle trailer braking system with means for sequentially activating the wheel brakes of the trailer from an electrical signal derived from a hydraulic actuation signal for the wheel brakes of the tow vehicle.

It is another object of this invention to provide a tow vehicle trailer braking system with a manual override means for actuating the wheel brakes of the trailer independently of the tow vehicle.

It is still another object of this invention to provide a tow vehicle trailer braking system with switching means selectively responsive to operational signals derived from the hydraulic fluid pressure for the wheel brakes of the tow vehicle, a manual input, and an automatic input derived from a sway sensing means for operating a control valve of a servomotor.

It is a further object of this invention to provide a tow vehicle trailer braking system with transducer means for converting a hydraulic signal from the tow vehicle to an electrical signal corresponding to a desired braking application force to operate a solenoid control valve means for developing a pressure differential in a servomotor which pressurizes hydraulic fluid to operate the wheel brakes of the trailer and provide a uniform deceleration during a braking application.

BRIEF DESCRIPTION OF THE DRAWING

In the drawing a tow vehicle trailer braking system is schematically illustrated with sectional views of a transducer means in the tow vehicle for converting a hydraulic signal to an electrical signal and a solenoid control valve means in the trailer operated by the electrical signal to sequentially provide uniform deceleration during a braking application.

DETAILED DESCRIPTION OF THE PREFERRED EMBODIMENT

In the embodiment shown in the drawing, the braking system 10 for the trailer is sequentially activated from an operational command signal transmitted from a switching means 12 in response to an input selected from the braking system 14 of the tow vehicle, a manual input control means 16, or an anti-sway control means 18 on the trailer. The command signal from the switching means 12 will activate a solenoid control valve means 20 to regulate the actuation of a servomotor means 22. Upon actuation of the servomotor means 22, an intensifying means 24 will pressurize the hydraulic fluid in conduit 26. The pressurized hydraulic fluid in conduit 26 will expand the cylinders 28 in each of the wheel brakes 30 of the trailer to uniformly provide a deceleration force to reduce the rotary movement of the wheels of the trailer.

In more particular detail, the various operational elements essential for the uniform braking of a tow vehicle trailer will now be described.

The servomotor means 22 has a housing 32 with a rear chamber 34 separated from a front chamber 36 by a wall means 38. A push rod 40 is attached to the wall means and extends into the intensifying chamber 24 to move a piston (not shown) located therein to provide the force for pressurizing the hydraulic fluid in conduit 26. The front chamber 36 has an inlet port 42 connected to a vacuum reservoir 44 by a conduit 46. The vacuum in reservoir 44 will evacuate air from the front chamber to allow a return spring 48 to urge the wall means 38 toward the rear chamber 34.

The rear chamber 34 has an inlet port 50 connected to an outlet port 52 of the solenoid control valve means 20 by a conduit 54. The control valve means 20 will regulate the communication of vacuum and air at atmospheric pressure through the outlet port 52 to either evacuate the air from the rear chamber 34 and vacuum suspend the wall means 38 or allow air at atmospheric pressure flow into the rear chamber and create a pressure differential across wall means 38 for moving the piston in the intensifying means 24.

The solenoid control valve means 20 has a housing 56 with a stepped bore 58 extending axially therethrough. The stepped bore 58 has a first inlet port 60 connected to conduit 46 goining to the vacuum reservoir 44 and a second inlet 62 opened to the atmosphere.

A plunger 64 located in the stepped bore 58 has a guide surface 66 connected to a piston 68 by a stem 70. The piston 68 is located in a sensing chamber 72 which is connected to the conduit 26 by a conduit 74. The sensing chamber 72 has a hole 76 opened to the atmosphere to allow any hydraulic fluid which may seep past seal 78 to drain. The guide surface 66 has a rearwardly extending tubular projection 80 with an atmospheric seat 82 at its terminus.

A push rod 84 has a spherical end 86 retained in the tubular projection 80 and a cylindrical end 88 held in a bearing wall 90 and connected to a plunger 92. An annular poppet 94 has one end 93 secured to the housing 56 by a retainer 96 and another end 95 loosely surrounding the push rod 84. A first spring 98 that surrounds the push rod 84 has one end fixed to the retainer 96 and the other end secured to the loose end 95 of the poppet 94. The spring 98 will urge end 95 against the annular shoulder 100 in the housing. A return spring 104 is fixed to the retainer 96 and acts on the push rod 84 to correspondingly urge the atmospheric seat 82 against the end 95. Thus, air at atmospheric pressure will be prevented from entering the control chamber 102 and vacuum from the inlet port 60 can have uninterrupted communication to the rear chamber 34 through the outlet port 52. The return spring 104 will also move the plunger 92 past the center of an electrical coil 106 in opposition to a dampening spring 109. The coil 106 is connected by leads 108 to the switching means 12.

The switching means 12 is a flip-flop type contact arrangement wherein a single higher electrical potential selected from the hand control 16, the transducer means 110 and the sway control means 18 overrides any electrical potential in the switching means to independently energize the electrical coil 106 and develop a braking application.

The sway control means 18 is located on the trailer and usually will have a mercury type switch with a modified circuit which can only be activated through harmonic horizontal motion over a set period of time. Thus, the sway control will be unaffected through normal turning maneuvers.

The hand control means 16 includes a lever arm 112 designed to provide a varying resistance in lead lines 113. The varying resistance is designed to correspond to a desired braking deceleration. When the lever arm 112 is moved toward "Full" while the tow vehicle is running, a braking signal will activate the wheel brakes.

The transducer means 110 includes a housing 114 with a control chamber 116 located therein. A bellows 118 located in the control chamber 116 has one end 120 fixed around an opening 122 in the housing 114. The opening 122 is connected through a conduit 124 to the conduit 126. The conduit 126 supplies the wheel cylinder 128 on the rear of the tow vehicle with operational hydraulic fluid from master cylinder 130 during a braking application.

A cap 132 is secured to the other end 134 of the bellows to form a sensing chamber 136 for monitoring the pressure of the hydraulic fluid in the conduit 126. A stem 138 extends from cap 132 through the housing 114 and is connected to the switching means 12 by lead 140. A spring 142 surrounds the stem 140 and acts on cap 132 to oppose the expansion of the bellows 118 upon hydraulic fluid under pressure being present in conduit 126.

A contact 144 is secured to the cap 132 to establish electrical continuity with a variable resistor 146. The variable resistor is connected to the switching means 12 by lead 148 to complete the circuit between the transducer means 110 and the switching means 12. The variable resistor 146 will be selected to correspond to a deceleration rate suitable for braking the trailer by establishing an electrical signal for operating the solenoid control valve means 20 in conformity with the braking of the tow vehicle.

MODE OF OPERATION OF THE PREFERRED EMBODIMENT

An operator will be situated in the tow vehicle and have access to the hand control means 16 and the foot operated pedal 150. When the tow vehicle is operating, vacuum produced at the manifold 152 will be communicated through conduit 154, past check valve 156, to evacuate the vacuum reservoir 44. With the vacuum reservoir 44 evacuated, the servomotor 22 will correspondingly be vacuum suspended.

When the operator desires to stop the tow vehicle trailer combination, an input force will be applied to the brake pedal 150 to activate the master cylinder 130 and send pressurized fluid to both the front brakes 158 and the rear brakes 160 through conduits 162 and 126, respectively. The pressure of the hydraulic fluid in conduit 126 will simultaneously be presented in sensing chamber 136. The hydraulic pressure in the sensing chamber 136 will expand the bellows 118 causing contact 144 to engage the variable resistor 146 at a different location. The electrical circuit through the contact 144 and variable resistor 146 will modify the electrical current flowing from the battery 164 through lead 140. This modified electrical current will provide a first operational electrical signal representative of the pressure of the hydraulic fluid supplied the wheel brakes of the tow vehicle. The first operational electrical signal carried by lead 148 will be transmitted through switching means 12 to energize coil 106. With coil 106 energized, a magnetic flux will be developed therein which will attempt to move the plunger 92 toward the center of the coil 106 in opposition to the return spring 104. As the plunger 92 moves the push rod 84, end 95 of the annular poppet 94 will be seated on shoulder 100 to interrupt vacuum communication between the first inlet port 60 and the outlet port 52. With further movement of the push rod 84 the atmospheric seat 82 will move away from the annular poppet 94 and allows air at atmospheric pressure to flow from the second port 62 through bore 58 and out the outlet port 52 into the rear chamber 34. With air in the rear chamber 34 and vacuum in the front chamber, a pressure differential will be developed across the wall means 38 of the servomotor 22. The pressure differential will move the wall means 38 to apply an input force on the piston in the intensifying means 24 which pressurizes the hydraulic fluid for operating the wheel brakes 30 of the trailer.

The same hydraulic fluid pressure transmitted through conduit 26 to the wheel brakes of the trailer is carried through conduit 74 to sensing chamber 72. This hydraulic feedback will provide a reactionary force which acts on piston 68 and balances the input from the push rod 84. Thus, the wheel brakes of the trailer will sequentially be applied with the wheel brakes of the tow vehicle.

Upon release of the brake pedal 150, the hydraulic fluid pressure in conduit 126 will terminate and return spring 142 will reposition bellows 118 to nullify the electrical signal transmitted through lead 148. With the electrical signal nullified, the coil 106 will be de-energized. Upon de-energization the magnetic flux positioning plunger 92 will also terminate allowing return spring 104 to again move the atmospheric valve seat 82 against the poppet 94 and the end 95 of the poppet 94 away from the shoulder 100 to re-establish vacuum communication from the first inlet port 60 to the outlet port 52. As the vacuum communication from the reservoir 44 evacuates the air from the rear chamber 34, the pressure differential across the wall means 38 will be eliminated and the hydraulic fluid under pressure correspondingly terminated.

In the event that an operator is traveling on a highway and experiences conditions causing the trailer to sway in a harmonic rhythm, the anti-sway means 18 will send an electrical signal through lead lines 168 to the switching means 12 to momentarily energize the solenoid control valve means 20 to develop a braking force on the wheel brakes of the trailer. This braking force will act as a drag causing the tow vehicle trailer to straighten out and compensate for the adverse sway conditions. simultaneously, an intermittent electrical signal will be transmitted to light 170, to visually provide the operator with an indication that a sway condition exists. With all wheel brakes, if this intermittent actuation continues over a long period of time, the brakes will heat up and a "fade" condition could occur upon a hard brake application, thereby increasing the distance needed to stop the tow vehicle trailer combination. Therefore, if the indicator light 170 is actuated intermittently, it should be sufficient warning that a reduction in speed is advisable.

Similarly, the hand control means 16 upon moving from the "OFF" position toward "FULL" will provide an electrical signal through lead 114 to operate the switching means 12. This electrical signal will energize the solenoid valve means 20 and develop a pressurized hydraulic fluid for operating the wheel brake 30 in a manner previously described. During the operation of the hand control valve means 16, light 170 will be continually energized to so indicate that the wheel brake in the trailer is applied and should be released if unrestricted movement of the trailer is desired.

I claim:

1. In a tow vehicle-trailer braking system having separately operated wheel brakes on the tow vehicle and the trailer, means responsive to the actuation of the wheel brakes of the tow vehicle for operating the wheel brakes of the trailer, said means comprising:
   a first housing having first and second chambers therein separated by wall means, said second chamber being connected to a source of vacuum;
   piston means attached to said wall means for pressurizing hydraulic fluid for operating said trailer brakes;
   a second housing having a bore therein, said bore having a first inlet port connected to said source of vacuum, a second inlet port connected to the atmosphere, an outlet port connected to said first chamber;
   control valve means located in said bore for regulating the communication of vacuum and air at atmospheric pressure from the first and second inlet ports to the first outlet port;
   actuation means connected to said control valve means for supplying an operational input to selectively position said control valve means in response to a first operational signal; and
   transducer means connected to said tow vehicle for converting the operation of the wheel brakes of the tow vehicle into said first operational signal to sequentially operate the wheel brakes of the trailer.

2. The tow vehicle-trailer braking system, as recited in claim 1, wherein said actuation means includes:
   hand control means for developing a second operational signal independently of said first operational signal to position said control valve means and operate said trailer brakes in response to an operator input.

3. The tow vehicle-trailer braking system, as recited in claim 1, wherein said actuation means further includes:
   switching means for comparing said first and second operational signals and transmitting the more demanding signal to operate said control valve means.

4. The tow vehicle-trailer braking system, as recited in claim 3, wherein said second housing further includes:
   a reaction chamber having means therein connected to said control valve means for balancing said operational input to limit the flow of air at atmospheric pressure through the first output port to said first chamber.

5. The tow vehicle-trailer braking system, as recited in claim 4, wherein said control valve means includes:
   first plunger means located in said bore having an annular face extending from a guide surface on one end and a second piston on the other end, said second piston extending into said reaction chamber, said reaction chamber being connected to receive a operational hydraulic fluid for the trailer brakes;
   poppet means located in said bore between said first and second inlet ports for cooperating with said annular face on the first plunger means and an annular seat in said bore for preventing simultaneous communication of air at atmospheric pressure and vacuum through said outlet port; and
   push rod means responsive to said actuation means for moving said plunger means away from said poppet means to interrupt the communication of vacuum from the first port to the first chamber and permit air at atmospheric pressure to freely flow through the outlet port into the first chamber and create a pressure differential across said wall means with the vacuum in the second chamber, said pressure differential moving said piston means to pressurize the operational fluid for the trailer brakes.

6. The tow vehicle-trailer braking system, as recited in claim 5, wherein said actuation means includes:
   solenoid means located in said bore and connected to said transducer means; and
   second plunger means surrounded by said solenoid means and connected to said push rod for transmitting said operational input force to said first plunger means.

7. The tow vehicle-trailer braking system, as recited in claim 6, wherein said transducer means includes:
   a third housing having a control chamber therein, said control chamber being connected to receive the operational hydraulic fluid for the wheel brakes of said tow vehicle; and monitor means located in said control chamber for developing said first operational signal from the hydraulic fluid for the wheel brakes of said tow vehicle.

8. The tow vehicle-trailer braking system, as recited in claim 7, wherein said monitor means includes:
a bellows fixed on one end to the third housing and surrounding the opening through which the hydraulic fluid from the tow vehicle is received, and another end;
cap means located on said another end for closing the bellows, said cap means having a stem extending through an insulating bearing in said third housing;
resilient means located between said cap means and said third housing for opposing expansion of said bellows by said hydraulic fluid operating said wheel brakes of the tow vehicle;
variable resistor means located in said control chamber and connected to said switching means; and
contact means carried by said bellows and connected to said switching means for engaging said variable resistor means to modify said first operational signal in a direct relationship to the pressure of the hydraulic fluid communicated to the wheel brakes of the tow vehicle.

9. The tow vehicle-trailer braking system, as recited in claim 8, including:
sway control means carried by said trailer and connected to said switching means responsive to horizontal harmonic motion for developing a third operational signal for operating said solenoid means to create a pressure differential across said wall means and momentarily actuate said wheel brakes of the trailer brakes.

10. The tow vehicle-trailer braking system, as in claim 9, including:
display means connected to said switching means for providing a continuous visual indication to an operator in the tow vehicle during transmission of said first and second operational signal to said solenoid means and a sequentially interrupted signal upon said third operational signal being transmitted.

11. In a tow vehicle-trailer braking system having separately operated wheel brakes on the tow vehicle and the trailer, means responsive to the actuation of the wheel brakes of the tow vehicle for operating the wheel brakes of the trailer, said means comprising:
a first housing having first and second chambers therein separated by wall means, said second chamber being connected to a first source of pressure, said wall means being adapted to pressurize a fluid for operating said trailer brakes;
a second housing having a bore therein, said bore having a first inlet port connected to said source of pressure, a second inlet port connected to a second source of pressure, an outlet port connected to said first chamber;
control valve means located in said bore for regulating the communication of said first and second sources of pressure from the first and second inlet ports to the first outlet port;
actuation means connected to said control valve means for supplying an operational input to selectively position said control valve in response to a first operational signal; and
transducer means connected to said tow vehicle for converting the operation of the wheel brakes of the tow vehicle into said first operational signal to sequentially operate the wheel brakes of the trailer.

12. The tow vehicle-trailer braking system, as recited in claim 11, wherein said transducer means includes:
monitor means proportionally responsive to increases in actuation forces to said tow vehicle for developing a corresponding operational signal to operate said control valve means.

* * * * *